Nov. 29, 1949     E. COLE     2,489,270
DIRECTION FINDER SYSTEM
Filed Jan. 4, 1947
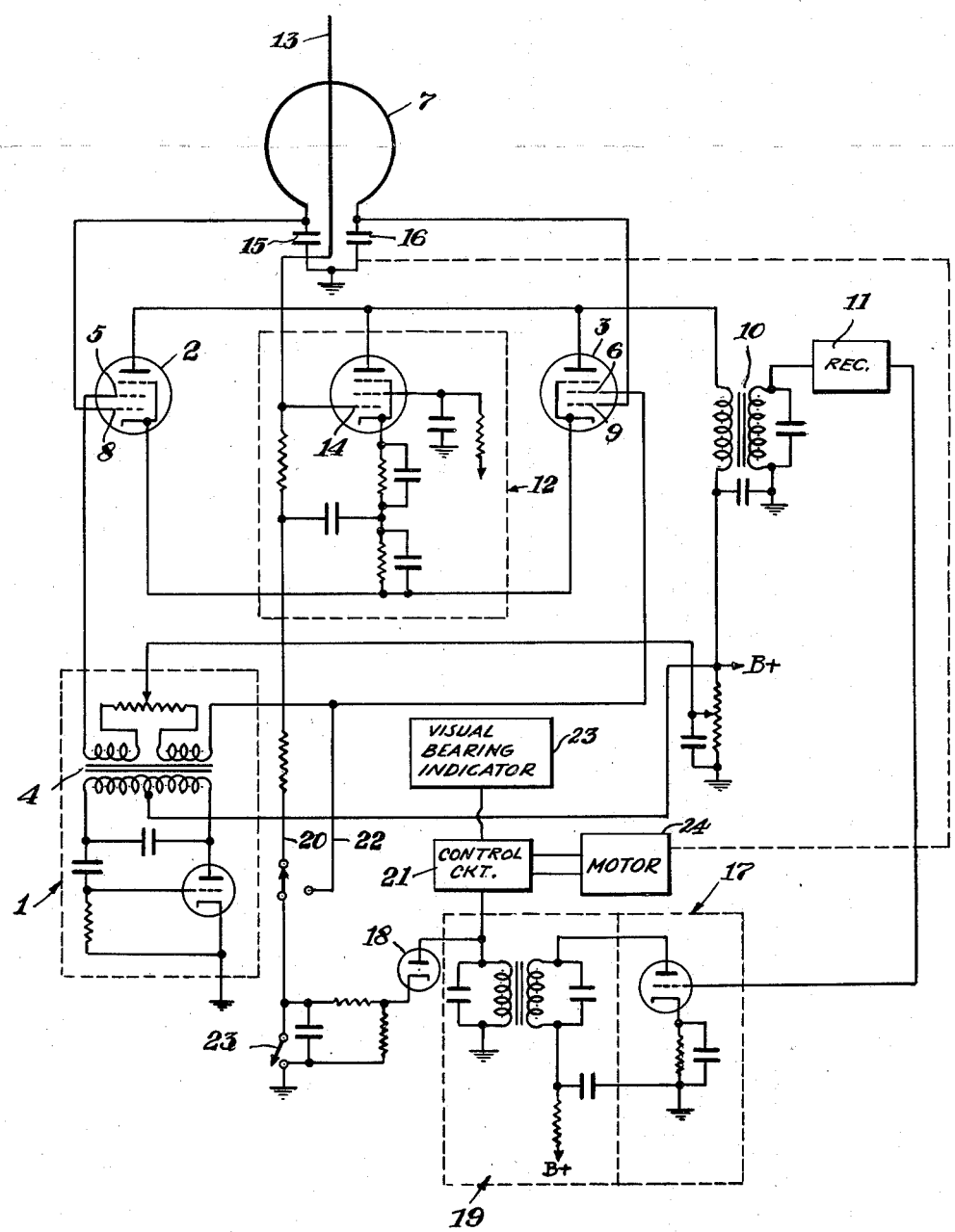
INVENTOR.
EUGENE COLE
BY *R. P. Morris*
ATTORNEY Patented Nov. 29, 1949

2,489,270

UNITED STATES PATENT OFFICE 2,489,270

DIRECTION FINDER SYSTEM

Eugene Cole, Long Island, N. Y., assignor to Federal Telecommunications Labs. Inc., New York, N. Y., a corporation of Delaware Application January 4, 1947, Serial No. 720,155

10 Claims. (Cl. 343—117)

This invention relates to automatic indicating direction finders, and particularly the type providing control of the amplitude of the sense voltage during bearing seeking operation.

Direction finders of the type using rotating loop antennas or fixed Adcock antenna arrays are well known. In order to resolve the 180° sense ambiguity which is commonly associated with the use of these antennas, a sense antenna, usually of the vertical omni-directional type, is provided. In one instance employing a fixed Adcock array having an omni-directional reception pattern, a sense antenna is adapted to be switched in to the bearing translating device for altering the omni-directional pattern to a cardioid shaped pattern. The use of the cardioid shaped pattern during bearing seeking operation enables the resolving of the 180° sense ambiguity of this system.

One of the objects of this invention is to provide an improved sensing system for direction finders and more particularly one which is automatic in operation.

Another object of this invention is to provide automatic means for controlling the sense voltage particularly its magnitude used in resolving 180° sense ambiguity of direction finder systems.

Another related object of this invention is to provide automatic means for improving the sensitivity of the direction finder about the zero or null indication.

In a preferred embodiment of the present invention low frequency signals are separately mixed with the signals received from a loop antenna and a sense antenna. Means are further provided for using the low frequency signals after detection in a radio direction finder receiver coupled to the antenna system for controlling the sense voltage applied to the bearing resolving system.

The above mentioned and other features and objects of this invention will become more apparent and the invention itself, though not necessarily defined by said feature and objects, will be best understood by reference to the following description of an embodiment of the invention taken in connection with the single figure of the drawing, wherein there is shown a block circuit diagram of an automatic direction finder sense control system employing modulation and embodying the invention.

The single figure shows a low frequency oscillator 1 arranged to supply voltage to a pair of radio frequency modulators 2 and 3. These modulating voltages are applied in phase opposition through transformer 4 to the secondary control elements 5 and 6 of tubes 2 and 3 respectively. The radio frequency voltages from the radio direction finder loop 7 are applied, in phase opposition, to the primary control elements 8 and 9 of tubes 2 and 3 respectively. The plates of tubes 2 and 3 are coupled in parallel such that their plate currents are additive and connected to a common load 10. Under these conditions a carrier suppressed modulated wave is produced. The voltages developed across the load 10 are then passed to a conventional receiver 11 where a tone, preferably audible is produced. The frequency of this tone will be twice the frequency of the low frequency oscillator modulator 1.

An amplifier 12 is also connected to the common load 10. The grid voltage of amplifier 12 is supplied by the sense antenna 13 which is coupled to the primary control element 14. The sense antenna voltage, and the loop voltage developed across the loop tuning condensers 15 and 16 will normally be in phase or out of phase dependent on which end of the loop is being considered, and therefore affords means for resolving the 180° sense ambiguity.

For convenience it is assumed that tubes 2, 3 and 12 have equal amplification for the radio frequency voltages. Now if the sense voltage is equal to or greater than the loop voltage, the voltage being fed to the receiver will be the conventional amplitude modulated wave enabling the resolving of sense ambiguity. The tone and the output of the receiver will now be of the same frequency as the modulator 1.

Expressing these relations:

The involtage induced in the loop is $$E_L = h \cos \theta (\sin \omega_1 t)$$

where $h$ equals the effective height of the loop;
$\theta$ = angle of arrival of electromagnetic wave;
$\sin \omega t$ = arriving wave;

The voltages appearing at 8 and 9 across the tuning condensers 15 and 16 are:

$$E_8 = A_1 h/2 \cos \theta (\sin \omega_1 t)$$
$$E_9 = -A_1 h/2 \cos \theta (\sin \omega_1 t)$$

The voltage induced in the vertical or sense antenna 13 is $$E_{13} = A_2 h/2 \sin \omega_1 t$$

Replacing the expressions $A_1 h/2$ and $A_2 h/2$ with constants $V_1$ and $V_2$ respectively, the contribution of tubes 2, 3, and 4 to the load 10 for a modulating voltage of sin ($\omega_2 t$) and $-\sin(\omega_2 t)$ is $$E_2 = V_3 \sin \omega_2 t (V_1 \cos \theta \sin \omega_1 t)$$

$$E_3 = -V_3 \sin \omega_2 t (V_1 \cos \theta \sin \omega_1 t)$$

$$E_{12} = V_2 \sin \omega_1 t$$

The contribution to the receiver 11 is $$E_{11} = V_2 \sin \omega_1 t + V_1 V_3 \cos \theta [\cos(\omega_2 - \omega_1) t - \cos(\omega_2 + \omega_1) t]$$

This is the expression for a conventional amplitude modulated wave. The modulation will be maximum when $$\frac{V_2}{2} = V_1 V_3 \cos \theta \text{ (100\% modulated wave)}$$

where $V_1$, $V_2$ are constants as specified above and $V_3$ is a constant dependent upon $E_2$ and $E_3$.

Under normal operational conditions the maximum amplitude of the modulation component attainable at the receiver output is proportional to the cosine of the angle of arrival $\theta$. This means that a variation in amplitude of zero to some other arbitrary value exists. In order to sharpen the indication about the zero or null-position, some sort of limiting action is desirable. If the indicator operation is confined so that it responds only to signals of the same frequency as oscillator 1, this limiting action can be arranged. In this connection there is provided an isolating amplifier 17 coupled to a diode detector 18 through a narrow band-pass filter 19 designed to pass the frequency of oscillator 1. The diode 18 provides negative voltage proportional to the signal amplitude. The gain of tube 12, preferably of the variable mu type pentode, is controlled by applying the potential from diode 18 to the primary control element 14 through connection 20.

As the loop becomes oriented to the null or zero indication of the incoming radio frequency signal the negative voltage applied to the control element 14 of tube 12 is decreased proportionately, resulting in a greater amplification of the sense voltage used for mixing with the loop voltages across the load 10. This results in producing steeper slope to the null portion of the direction finder reception pattern signals which are applied to receiver 11 and results in a more precise bearing indication. As the direction finder antenna system approaches the bearing, the indication is sharpened about the null position.

The input to the detector 18 is also passed to a control circuit 21, and may be used for controlling the orientation of loop antenna 7. This control can take several forms, as for example, a visual indicator 23, an audio indicator or a control circuit of an automatic null-seeking direction finder wherein the amplitude of the signal as received in the control circuit 21 controls motor 24 for rotating the loop 7.

If the control voltage from the output of the diode detector 18 is only applied to the primary control element of only tubes 2 and 3 simultaneously through connection 22, a further advantage is attained. It is then possible to operate a bearing indicator in the control circuit of an automatic direction finder system without appreciably impairing the audibility of modulated signals. Since the indicator operates on a fixed frequency, the sensitivity of the indication may be increased a factor proportional to the ratio of the audio response band width to the indicator channel band width. This factor can readily exceed 20 db. If the sensitivity of the indicator and audio reproducer are of the same order, the modulation products produced by the loop modulators may be reduced by 20 db. or more while maintaining the same signal to noise ratio at the indicator as exists in the reproducer. If a switch 23 located in the coupling network between said diode 18 and the said control connection, is closed, this direction finder automatic volume control action may be eliminated, as by short-circuit thereby making it an optional feature in an automatic direction finder.

While I have described above the principles of my invention in connection with specific apparatus and particular modifications thereof, it is to be clearly understood that this description is made only by way of example and not as a limitation of the scope of my invention.

I claim:

1. A radio direction finder having means to receive component energies of directional and omni-directional patterns and to produce therefrom a resultant energy reception pattern for determining the bearing of received radiant energy, comprising means to derive from said resultant a control energy and means for applying said control energy to the means for receiving the energy of one of said components whereby the directivity of said resultant pattern is continuously varied as said bearing is approached.

2. In a radio direction finder system of the type comprising an effectively rotating directional antenna and a sense antenna, a signal source of given frequency, means for mixing signals from said source and the electrical signals received by said directional antenna, means for combining said mixed signals with the signals from said sense antenna, means for demodulating said combined signals, means for translating said demodulated signals to obtain the direction of received electrical signals, means for producing a bias signal corresponding to the amplitude of said demodulated signals, said bias signal controlling the relative intensities of the signals from said directional and sense antennas whereby the sensitivity of said translating means is increased about the null position of the combined antenna reception pattern.

3. A radio direction finder system comprising an effectively rotating directional antenna, a sense antenna, a low frequency signal source, means for mixing said low frequency signals and the electrical signals received by said directional antenna, means for combining the signal received by said sense antenna and said mixed signals, means for demodulating said combined signals, means for deriving from said demodulated signal a control energy for effectively controlling the rotation of said directional antenna, means for producing a bias signal corresponding to the amplitude of said demodulated signals, means responsive to said bias signal for controlling the relative intensity of said directional and sense antenna signals before combining whereby the sensitivity of said control means is increased about the null position of the antenna reception pattern.

4. A radio direction finder system comprising an effectively rotating directive antenna, a sense antenna, a low frequency signal source, means for mixing said low frequency signals and the electrical signals received by said directional antenna, means for combining the signal received by said sense antenna and said mixed signals, means for demodulating said combined signal means responsive to said demodulated signals for effectively controlling the rotation of said directional antenna, means for producing a bias signal proportional to the amplitude of said demodulated signals means responsive to the value of said bias signal for controlling the amplitude of said sense antenna signal for mixing with said low frequency signals to vary inversely with the amplitude of said demodulated signals.

5. A radio direction finder comprising an effectively rotating directional antenna, a sense antenna, a source of low frequency signals, a first and second mixing circuit, and a receiver, means for modulating the electrical signals received by said directional antenna comprising said low frequency source and said first and second mixer circuits, means coupling the output of said first and second mixers to said receiver whereby carrier suppressed low frequency modulated electrical signals are produced in said receiver, a third mixer circuit, means for coupling the electrical signals received by said sense antenna through said third mixer to said receiver, said receiver comprising means for demodulating the signals applied thereto for obtaining said low frequency signals, means for effectively controlling the rotation of said directional antenna, means for applying said demodulated signals to said controlling means, means for producing a bias signal proportional to said demodulated signals, means for applying said bias signal to said third mixer circuit whereby the amplitude of said sense antenna signal applied to said receiver varies inversely proportionally with the amplitude of said demodulated signals.

6. In a radio direction finder of the type comprising an effectively rotating directional antenna and a sense antenna, a source of electrical signals of given frequency and a receiver, a first and second mixing circuit, means for modulating the the electrical signals received by said directional antenna comprising said given frequency source and said first and second mixer circuits, the output of said first and second mixing circuits comprising carrier suppressed given frequency modulated electrical signals, means for applying said last named signals to said receiver a third mixing circuit, means for coupling the electrical signals received by said sense, means for coupling the electrical signals received by said sense antenna through said third mixing circuit to said receiver, said receiver comprising means for demodulating the signals applied thereto for obtaining said given frequency signals a translating means and means for applying thereto said demodulated signals whereby the direction of antennae received electrical signals is determined, means for producing a bias signal corresponding to said demodulated signals, means for applying said bias signals to said first and second mixer circuits whereby the sensitivity of said translating means is increased about the null-position of the reception pattern of said directive antennae.

7. A radio direction finder comprising an effectively rotating directional antenna, a sense antenna, a receiving means, a source of given frequency signals, a first and second mixing circuit, means for modulating the electrical signals received by said directional antenna comprising said low frequency source and said first and second mixer circuits the output of said first and second mixers being electrically coupled to said receiving means whereby carrier suppressed low frequency modulated electrical signals are passed to said receiving means, a third mixer circuit, means for coupling the electrical signals received by said sense antenna through said third mixer to said receiving means, said receiving means comprising means for demodulating the signals applied thereto for obtaining said given frequency signals, means responsive to said demodulated signals for effectively controlling the rotation of said directional antenna, means for producing a bias signal proportional to said demodulated signals, means for applying said bias signals to said first and second mixer circuits whereby the sensitivity of said control means is increased about the null-position of the reception pattern of said directive antenna.

8. In a radio direction finder system of the type comprising an effectively rotating directional antenna, and sense antenna, a receiving means, a first and second electron discharge device, having control electrodes, means for applying modulation signals from said given frequency signal source in phase opposition to control electrodes of said first and second device, means for applying electrical signals received by said directional antenna in phase opposition to control electrodes of said first and second device means for coupling the output of said first and second device to said receiving means, a third electron discharge device having control electrodes, means for coupling the electrical signals received by said sense antenna to a control electrode of said third device, means for coupling the output of said third device to said receiving means, an amplifier circuit coupled to the output of said receiving means, said amplifier circuit having its output coupled through a band pass filter to the input of a detector circuit, said band pass filter being tuned to pass said given frequency signals from said receiving means. means for translating said filtered signals to obtain the direction of received electrical signals, means for applying the output of said detector to control electrodes of said first and second device whereby the sensitivity of the direction finder is improved about the null-position of the reception pattern of said directional antenna.

9. In a radio direction finder system of the type comprising an effectively rotating directive antenna and a sense antenna a source of fixed frequency modulation signals, a receiving means, a first and second electron discharge device, having control electrodes means for applying modulation signals from said fixed frequency source in phase opposition to control electrodes of said first and second device, means for applying electrical signals received by said directional antenna in phase opposition to control electrodes of said first and second device, means for coupling the output of said first and second device to said receiving means, a third electrical discharge device, having control electrodes means for coupling the electrical signals received by said sense antenna to a control electrode of said third device, means for coupling the output of said third device to said receiving means an amplifier circuit coupled to the output of said receiving means, said amplifier circuit having its output circuit coupled through a band pass filter to the input of a detector circuit, said band pass filter being tuned to pass said fixed frequency signals, from said receiving means, means responsive to said band pass filter output for effectively controlling the rotation of said omni-directional antenna, means for applying the output of said detector to control electrodes of said first and second device whereby the sensitivity of the direction finder is increased about the null-position of the reception pattern of said directive antenna.

10. In a radio direction finder system of the type comprising an effectively rotating directive antenna, and a sense antenna, a source of low frequency modulation signals, a receiving means a first and second electron discharge device, having control electrodes, means for applying modulation signals from said low frequency source in phase opposition to control electrodes of said first and second device, means for applying electrical signals received by said directional antenna in phase opposition to control electrodes of said first and second device, means for coupling the output of said first and second device to said receiving means, a third electron discharge device having control electrodes means for coupling the electrical signals received by said sense antenna to a control electrode of said third device, means for coupling the output of said third device to said receiving means, an amplifier circuit coupled to the output of said receiving means, said amplifier circuit having its output circuit coupled through a band pass filter to the input of a detector circuit, said band pass filter being tuned to pass said low frequency signals from said receiving means, means responsive to said band pass filter output for effectively controlling the rotation of said directive antenna, the output of said detector being coupled to a control electrode of said third device whereby a bias signal is produced, said bias signal controlling the amplification of said third device whereby the sense antenna signals applied to said receiving means vary in accordance with said receiving means output.

EUGENE COLE.

REFERENCES CITED

The following references are of record in the file of this patent:

UNITED STATES PATENTS

| Number | Name | Date |
|---|---|---|
| 2,171,561 | Hooven | Sept. 5, 1939 |
| 2,220,904 | Hooven | Nov. 12, 1940 |
| 2,314,029 | Bond et al. | Mar. 16, 1943 |